(12) United States Patent
Hetherington et al.

(10) Patent No.: US 6,388,686 B1
(45) Date of Patent: May 14, 2002

(54) METHOD, SYSTEM AND COMPUTER PROGRAM PRODUCT FOR ROTATING THROUGH A SEQUENCE OF DISPLAY STATES IN A MULTI-FIELD TEXT STRING CLASS IN A GRAPHICAL USER INTERFACE

(75) Inventors: David James Hetherington, Austin, TX (US); David Bruce Kumhyr, Fuguay-Varina; Stanford Louis Yates, Raleigh, both of NC (US)

(73) Assignee: International Business Machines corporation, Armonk, NY (US)

( * ) Notice: Subject to any disclaimer, the term of this patent is extended or adjusted under 35 U.S.C. 154(b) by 0 days.

(21) Appl. No.: 09/211,799

(22) Filed: Dec. 15, 1998

(51) Int. Cl.[7] .................................................. G06F 3/14
(52) U.S. Cl. ....................... 345/810; 345/828; 345/829; 345/834; 345/830
(58) Field of Search ............................... 345/353, 354, 345/352, 340, 341, 973, 184, 146, 810, 828, 829, 834

(56) References Cited

U.S. PATENT DOCUMENTS

| | | | | |
|---|---|---|---|---|
| 5,600,779 A | * | 2/1997 | Palmer | 345/340 |
| 5,758,285 A | * | 5/1998 | Ahlberg | 455/566 |
| 5,812,964 A | | 9/1998 | Finger | 704/7 |
| 5,815,148 A | * | 9/1998 | Tanaka | 345/335 |
| 6,028,600 A | * | 2/2000 | Rosin | 345/327 |

* cited by examiner

Primary Examiner—Raymond J. Bayerl
Assistant Examiner—Thomas T. Nguyen
(74) Attorney, Agent, or Firm—Marilyn Smith Dawkins Bracewell & Patterson, L.L.P.

(57) ABSTRACT

A rotate user control is provided to selectively change the current display item within a group of display items. Each actuation of the rotate control changes the current display item from one item to a next item within an internally nonrepeating, ordered sequence loop of all candidate display items. Each display item within the group is therefore displayed in turn, and a user may quickly review all available display items for a desired display item. An indicator provides a visual cue to the user of which display item is currently selected for display. With small groups of display items, such as a multi-field text string object having separate fields each containing a different representation of a text string, the rotate control provides faster switching between views than conventional display change controls such as drop-down boxes. The rotate control also provides a fixed view of the newly selected display field, unlike flyover pop-up box displays.

21 Claims, 4 Drawing Sheets

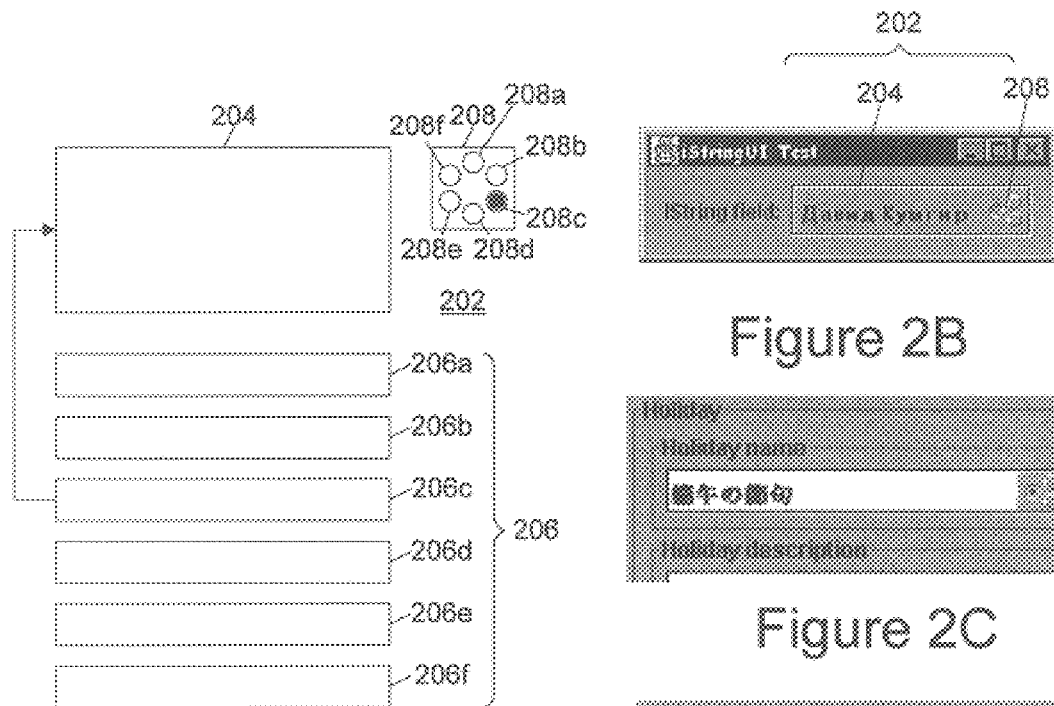
Figure 2A
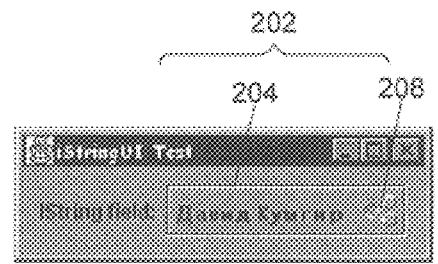
Figure 2B
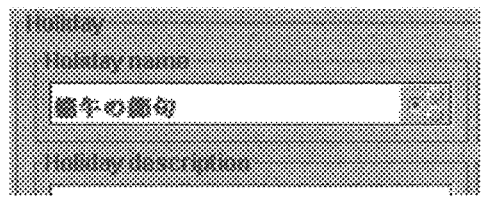
Figure 2C
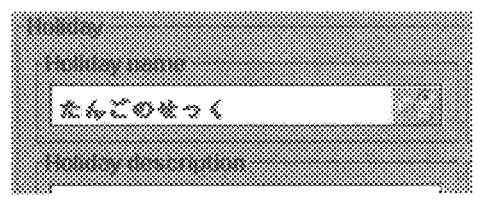
Figure 2D
Figure 2E
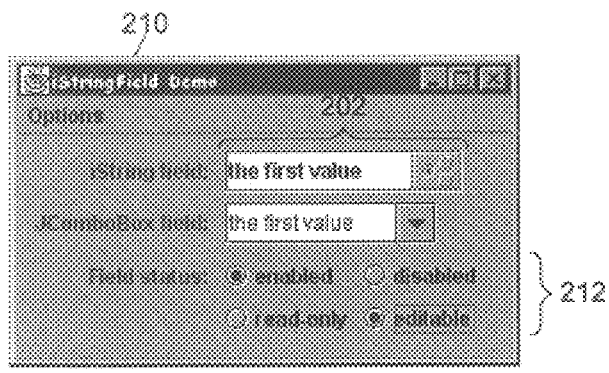
Figure 2F

METHOD, SYSTEM AND COMPUTER PROGRAM PRODUCT FOR ROTATING THROUGH A SEQUENCE OF DISPLAY STATES IN A MULTI-FIELD TEXT STRING CLASS IN A GRAPHICAL USER INTERFACE

RELATED APPLICATIONS

The present invention is related to the subject matter of the following commonly assigned, copending U.S. patent applications: Ser. No. 09/211,810 entitled "METHOD, SYSTEM, AND COMPUTER PROGRAM PRODUCT FOR PROVIDING A USER INTERFACE WITH ALTERNATIVE DISPLAY LANGUAGE CHOICES" and filed Dec. 15, 1998; Ser. No. 0/9211,809 entitled "METHOD, SYSTEM AND COMPUTER PROGRAM PRODUCT FOR CAPTURING LANGUAGE TRANSLATION AND SORTING INFORMATION INTO A TEXT STRING CLASS" and filed Dec. 15, 1998; Ser. No. 09/211,808 entitled "METHOD, SYSTEM AND COMPUTER PROGRAM PRODUCT FOR SORTING TEXT STRINGS" and filed Dec. 15, 1998; Ser. No. 09/211,803 entitled "METHOD, SYSTEM AND COMPUTER PROGRAM PRODUCT FOR STORING TRANSLITERATION AND/OR PHONETIC SPELLING INFORMATION IN A TEXT STRING CLASS" and filed Dec. 15, 1998; Ser. No. 09/211,802 entitled "METHOD, SYSTEM AND COMPUTER PROGRAM PRODUCT FOR CONTROLLING THE GRAPHICAL DISPLAY OF MULTI-FIELD TEXT STRING OBJECTS" and filed Dec. 15, 1998; Ser. No. 09/211,813 entitled "METHOD, SYSTEM AND COMPUTER PROGRAM PRODUCT FOR DISPLAYING THE CONTENTS OF ALL FIELDS IN A MULTI-FIELD TEXT STRING OBJECT" and filed Dec. 15, 1998; Ser. No. 09/211,802 entitled "METHOD, SYSTEM AND COMPUTER PROGRAM PRODUCT FOR DYNAMIC LANGUAGE SWITCHING IN A MULTI-FIELD TEXT STRING OBJECT VIA MESSAGING" and filed Dec. 15, 1998; and Ser. No. 09/211,812 entitled "METHOD, SYSTEM AND COMPUTER PROGRAM PRODUCT FOR AUTOMATIC CHARACTER TRANSLITERATION IN A TEXT STRING OBJECT" and filed Dec. 15, 1998. The content of the above-referenced applications is incorporated herein by reference.

BACKGROUND OF THE INVENTION

1. Technical Field

The present invention relates in general to altering user interface display of items within a group of display items and in particular to a user interface control altering a current display item within a group of display items. Still more particularly, the present invention relates to a user interface control changing a current display item progressively through a sequence of display items forming a loop.

2. Description of the Related Art

Frequently in data processing system user interfaces, the need arises for a control which allows the user to switch between display items among a group of display items. Usually, but not always, the switch between display items corresponds to some change in the operation of an application for which the user control is implemented. A simple example is font selection in a graphical word processing system, where a current font may be displayed in a "tool" bar and switching the display to show a different font changes the active font.

The most common user control for shifting a display item among a plurality of display items is a drop-down box containing a list of available display items. However, the drop-down box may obscure the display of information to be altered. Additionally, the user may not know which display item produces the desired effect, requiring the user to successively try a number of display items within the list of possible items until the desired item is identified. An example is a user seeking a particular clipart image within a library of clipart images, and unable to identify the correct image by name.

It would be desirable, therefore, to provide mechanism for selectively controlling which display item within a group of display items is displayed in a user interface. It would further be advantageous if the mechanism permitted the user to edit or otherwise manipulate the contents of a current display item.

SUMMARY OF THE INVENTION

It is therefore one object of the present invention to provide an improved method, system and computer program product for altering user interface display of items within a group of display items.

It is another object of the present invention to provide an improved method, system and computer program product for implementing a user interface control altering a current display item within a group of display items.

It is yet another object of the present invention to provide a method, system and computer program product for implementing a user interface control changing a current display item progressively through a sequence of display items forming a loop.

The foregoing objects are achieved as is now described. A rotate user control is provided to selectively change the current display item within a group of display items. Each actuation of the rotate control changes the current display item from one item to a next item within an internally nonrepeating, ordered sequence loop of all candidate display items. Each display item within the group is therefore displayed in turn, and a user may quickly review all available display items for a desired display item. An indicator provides a visual cue to the user of which display item is currently selected for display. With small groups of display items, such as a multi-field text string object having separate fields each containing a different representation of a text string, the rotate control provides faster switching between views than conventional display change controls such as drop-down boxes. The rotate control also provides a fixed view of the newly selected display field, unlike flyover pop-up box displays.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2A is a diagram of a rotate user interface control for selectively changing a current display progressively through a nonrepeating sequence of display items forming a loop in accordance with a preferred embodiment of the present invention;

FIGS. 2B–2F are examples of a rotate user interface control for changing a current display field progressively through a nonrepeating sequence of fields within a multi-field text string object in accordance with a preferred embodiment of the present invention;

DETAILED DESCRIPTION OF THE PREFERRED EMBODIMENT

Figure 1:
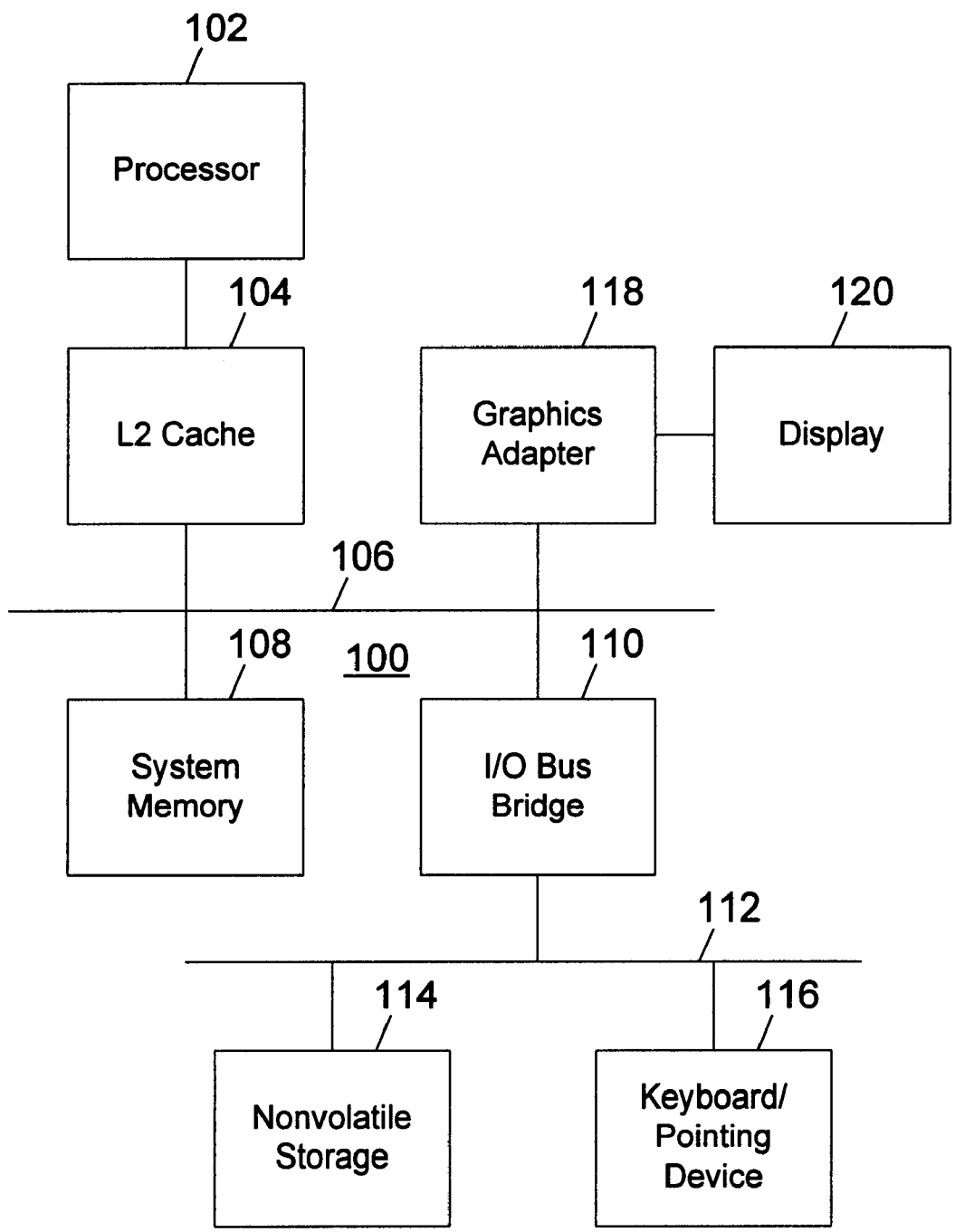
FIG. 1 depicts a diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the Aptiva® models of personal computers available from International Business Machines Corporation of Armonk, New York. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Referring to FIG. 2A, a diagram of a rotate user interface control for selectively changing a current display progressively through a nonrepeating sequence of display items forming a loop in accordance with a preferred embodiment of the present invention is depicted. Control 202 includes a display area 204 in which the contents of a display item currently selected from a group of display items 206 is displayed. Control 202 also includes a display control 208 which operates to change the currently selected display item from one item successively to the next in an sequence of display items 206.

Individual display items 206a–206f within the group of display items 206 are ordered in a nonrepeating sequence order forming a loop. Actuation of display control 208 rotates the current display item through this ordered sequence. Thus, the current display item may start with item 206a but changes, with each actuation of rotate display control 208, first to item 206b, then to item 206c (as shown in FIG. 2), then to item 206d, then to item 206e, and then to item 206f before returning, upon the next actuation of rotate display control 208, back to item 206a to repeat the sequence. Display items 206 thus form a continuous loop in which no item is repeatedly displayed until every other item has been displayed when rotate control 208 is employed to cycle through the available display items. Although six items are shown in the exemplary embodiment, any number of suitable items may be employed, even only one item. Display items 206 may be text strings, graphic images, or any other suitable display item.

Rotate control 208 in the exemplary embodiment includes a plurality of radio-button type indicators 208a–208f. These indicators identify which display item is the current display item, with the indicator 208c corresponding to the current display item 206c (in the embodiment shown) being filled. In one embodiment, the rotate control is actuated by "clicking" on the display area occupied by rotate control 208; that is—actuating a pointing device while a cursor controlled by the pointing device is located within the area of rotate control 208.

In alternative embodiments, clicking on a particular indicator 208a–208f may result in the current display item being changed directly to the display item corresponding to the selected indicator, skipping any intervening display items within the ordered sequence. Alternatively, the direction of rotation of the current display item within the ordered sequence may be varied by clicking on different sides of rotate control 208, or by "dragging" rotate control 208 around a central axis in a clockwise or counterclockwise direction. Thus, the current display field may be stepwise cycled through the ordered sequence of display items in either a forward or reverse order. Additionally, indicators other than radio buttons may be utilized, such as a different geometric shape for each item, or a different numeral or letter for each item, etc.

In a preferred embodiment, however, where only a small group of display items is controlled by rotate control 208, indicators 208a–208f preferably only identify a currently selected display item and do not act as individual controls for directly selecting the corresponding display item out of sequence. This allows indicators 208a–208f to be smaller, since only visual perception is required and not manipulation of a cursor into a display area occupied by a particular indicator. Additionally, with only a small group of display items as in the preferred embodiment, rotate control 208 preferably operates to step the current display item through the ordered sequence in only one direction. This simplifies operation of rotate control 208 and also permits a smaller overall area to be employed for rotate control 208.

Figure 3:
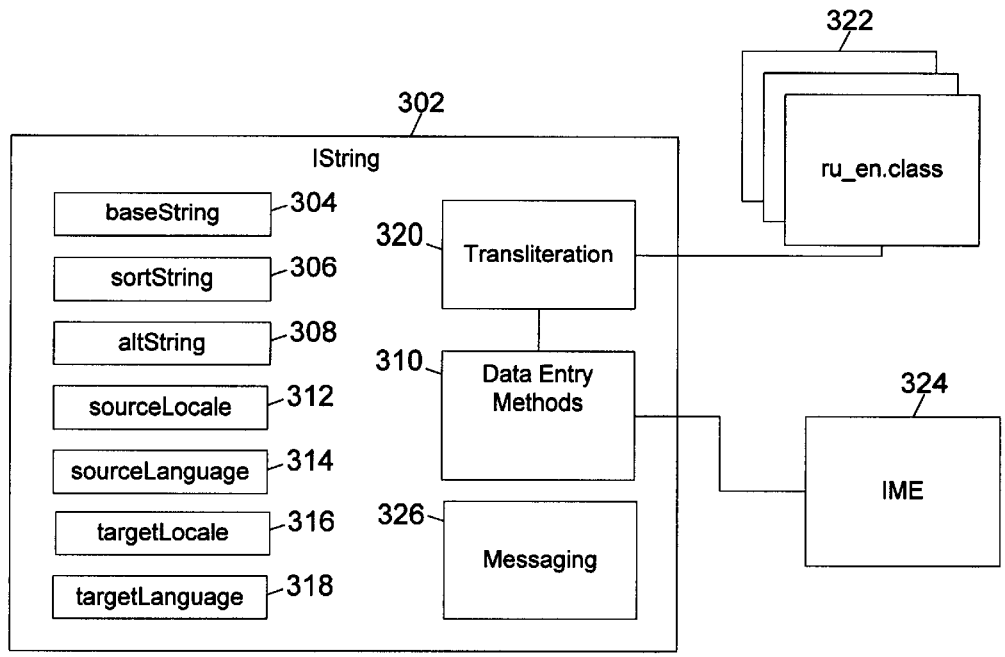
FIG. 3 depicts a diagram of a multi-field text string class for which a rotate user control may be implemented in accordance with a preferred embodiment of the present invention.

With reference now to FIG. 3, a diagram of a multi-field text string class for which a rotate user control may be implemented in accordance with a preferred embodiment of the present invention is depicted. Rotate control 208 described above in connection with FIG. 2 may be employed to alter the current display field of a multi-field text string object. International String Control ("IString") class 302 shown in FIG. 3 and described below is an example of such a multi-field text string object for which a rotate control may be advantageously implemented.

A fundamental problem in multinational computing environments which need to display or process data in multiple human languages is that a representation in one human language may become meaningless as the data migrates to a system running in a different human language. A need exists, therefore, to capture alternative human language representations. This need is satisfied by IString class 302.

IString class 302 is preferably a Java class similar to the Java String class, which behaves like the String class by including similar methods. Most of the original behavior of the String class should be preserved, with additional functionality added and utilized only as needed. IString class 302 is a datatype which captures some of the meaning of spoken words which is normally lost when the word is reduced to a visual representation. IString class 302 is preferably utilized for all object names and system messages within a system.

The IString class 302 structure includes three different strings for each name, message, data, or text object: a baseString 304, a sortString 306, and an altString 308. BaseString 304 is the string within IString class 302 employed by default in the user interface display and may contain any text, usually the original text entered by the user in the local language where the IString object is created. SortString 306 may also be any text and is employed to allow correct sorting of non-phonetic languages and languages which are difficult to sort based only on the binary value of baseString 304. AltString 308 may be any text but should conventionally be filled with a latin character set representation of the pronunciation of the data contained in baseString 304. Thus, IString class 302 includes the original text (baseString 304), a sort key (sortString 306), and a pronunciation key (altString 308) for object names, system messages, and other data.

When implemented in Java, a constructor for an IString class 302 object may be composed of the following fields:

```
/** The base text String */
protected String baseString;
/** The related text String for proper collation */
protected String sortString;
/** The related alternate text String (pronunciation key) */
protected String altString;
/** The source locale, as an ISO-3166 code; used for collation */
protected String sourceLocale;
/** The source language, as an ISO-639 code */
protected String sourceLanguage;
/** The source variant defined for EBCIDIC and case mapping */
protected String sourceVariant;
/** The target locale, as an ISO-3166 code */
protected String targetLocale;
/** The target language, as an ISO-639 code */
protected String targetLanguage;
/** The target variant defined for EBCIDIC and case mapping */
protected String targetVariant;
```

Complete listings of the upper-case, two letter ISO Country Codes defined by ISO-3166 and the lower-case, two letter ISO Language Codes defined by ISO-639 are readily available from a variety of sources on the Internet.

Table I illustrates how data within the IString data type 302 looks when represented as a table:

TABLE I

| Field | Type | Data |
|---|---|---|
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| targetLocale | Java String | ISO-3166 code, example "JP" |
| targetLanguage | Java String | ISO-639 code, example "ja" |

A Java constructor for a new, empty IString class object 302 where the contents are independent of language or locale may be:

```
/*****************************************************
 *
 * <P> </P>
 *
 * <dt> <b>Description:</b> <dd>
 * <p> Allocate a new IString containing no characters in the default
 * locale.</p>
 *
 *****************************************************/
public IString() {
    this.baseString = new String();
    this.sortString = new String();
    this.altString = new String();
}
```

To allow objects of the IString class 302 datatype to be stored in an Object Database (ODB), however, and to permit manipulation of IString data by legacy framework applications, an Interface Definition Language (IDL) class should be defined:

```
struct IString{
    string baseString;        //base test String
    string sortString;        //related text String for collation
    string altString;         //related alternate text String (pronunciation)
    string sourceLocale;      //source locale as an ISO-3166 code
    string sourceLanguage;    //source language as an ISO-639 code
    string targetLocale;      //target locale as an ISO-3166 code
    string targetLanguage;    //target language as an ISO-639 code
}
```

The contents of baseString 304, sortString 306, and altString 308 are preferably but not necessarily Unicode text entered by data entry methods 310 within IString class 302. Data entry methods 310, and thus the contents of baseString 304, sortString 306, and altString 308, may depend at least in part on language and locale parameters defined by sourceLocale field 312, sourceLanguage field 314, targetLocale field 316, and targetLanguage 318.

Because data entry methods 310 are dependent on the locale and/or langauge employed by the underlying host system, creation of a new IString object 302 preferably results in the locale and language properties of the host system in which the IString object 302 is created being placed in sourceLocale field 312 and sourceLanguage field 314. A constructor for allocating a new, empty IString for a specified locale and language determined from the host system in which the IString class object 302 is being created may be:

```
/****************************************************
*
* <P> </P>
*
* <dt> <b>Description:</b> <dd>
* <p> Allocate a new IString containing no characters in the
* specified locale.</p>
*
****************************************************/
public IString(Locale Loc) {
    this.baseString = new String();
    this.sortString = new String();
    this.altString = new String();
    this.sourceLocale = loc.getLocale();
    this.sourceLanguage = loc.getLanguage();
}
```

Input of data into an IString class 302 object is preferably locale- or language-dependent. The source-Language and targetLanguage properties 314 and 318 control how data is input into an IString class object 302 by data input methods 310. The sourceLanguage property 314 may be set to the language property of the host system on which the IString class object is created. The targetLanguage property 318 may also be set to that language, or may alternatively be set to a common, "universal", language such as English. Data input methods 310 compare sourceLanguage and targetLanguage properties 314 and 318 to determine what is entered into baseString 304, sortString 306, and altString 308 in an IString class object 302.

Character strings are entered into the baseString 304, sortString 306, and altString 308 fields by data input methods 320 for IString class 302, which may selectively utilize data from either the user's direct entry or specification, from transliteration engine 320, or from the Input Method Editor (IME) 324. Where the targetLanguage property 318 is set to English as a default, data entry methods 310 determine the contents of baseString 304, sortString 306, and altString 308 fields based upon the character set employed by the language in which data is entered by the user (sourceLanguage property 314).

For languages which employ the latin character set, the user input is placed by data entry methods 320 into all three fields (baseString 304, sortString 306, and altString 308) of the IString class 302 by data entry methods 310. A suitable constructor may be:

```
/****************************************************
*
* <P> </P>
*
* <dt> <b>Description:</b> <dd>
* <p> Allocate a new IString which contains the same sequence of
* characters as the string argument in the specified locale.</p>
*
****************************************************/
public IString(String str, Locale loc) {
    this.baseString = new String(str);
    this.sortString = new String(str);
    this.altString = new String(str);
    this.sourceLocale = loc.getLocale();
    this.sourceLanguage = loc.getLanguage();
}
```

For most locales and languages, the entered string will be input into all three fields of the IString object 302. If targetLanguage property 318 were not set to English, data entry methods 324 would input the user-entered text into all three fields whenever the languages identified in sourceLanguage and targetLanguage properties 314 and 318 employ a common character set (e.g., both employ latin characters, as in the case of Spanish and Afrikaans).

Table II illustrates how data is entered into IString class 302 fields where the host language and locale utilize the latin character set.

TABLE II

| Field | Type | Data |
|---|---|---|
| baseString | Java String | Hetherington |
| sortString | Java String | Hetherington |
| altString | Java String | Hetherington |
| sourceLocale | Java String | US |
| sourceLanguage | Java String | en |
| targetLocale | Java String | US |
| targetLanguage | Java String | en |

If desired, the fields may be individually edited and the object artificially promoted for sorting purposes by inserting a string having a lower sort value (e.g., "AAA_ Hetherington") into sortString 306.

For languages which do not employ the latin character set, but which utilize a character set which may be sound mapped to the latin character set, the user input is entered by data entry methods 310 into baseString 304 and sortString 306, but a transliterated, phonetic representation of the input is placed in altString 308. An internal method within the transliteration engine 320 is employed to sound-map the passed string to a phonetic, latin character representation for altString 308 to transliterate entered characters into other characters understandable to people who are not familiar with the character set of the original language.

To generate the contents of altString 308, transliteration engine 320 selects an appropriate Java resource file 322 containing a mapping table to create the alternate text to be placed in altString 308. The selection of the particular resource file which is employed based on the combination of source and target languages. Java resource files 322 are named for the combination of languages for which the mapping is being performed. In the example shown in FIG. 2, ru_en.class is for mapping Russian (Cyrillic characters) to English (Latin characters). The structure of resource file 322 is a table with associated entries for foreign language characters and corresponding latin characters.

A suitable constructor for an IString object in which altString 308 is transliterated from the passed string may be:

```
/****************************************************
*
* <P> </P>
*
* <dt> <b>Description:</b> <dd>
* <p> Allocate a new IString. The baseString and sortString are the
* passed string, the altString is transliterated into the target
* language. </p>
*
****************************************************/
public IString(String str) {
    this.baseString = new String(str);
    this.sortString = new String(str);
    if(isSameLanguage()(
        this.altString = new String(str);
    else
        this.altString = transmogrify(str,
                    this.sourceLanguage,
                    this.targetLanguage);
}
```

The "transmogrify" method is the internal method within transliteration engine 320 which was described above. The character set into which the entered characters are transliterated is determined from the targetLanguage property 318, which in the exemplary embodiment is assumed to be set to English. Given an appropriate resource file 322, however, characters may be transliterated between any two languages for which characters in one language sound-map to one or more characters in the other.

Table III illustrates how data is entered into IString class 302 by data entry methods 310 where the language utilizes a non-latin character set which maps to the latin character set, such as Russian Cyrillic.

TABLE III

| Field | Type | Data |
| --- | --- | --- |
| baseString | Java String | Давид Кухгир |
| sortString | Java String | Давид Кухгир |
| altString | Java String | David Kumhyr |
| sourceLocale | Java String | RU |
| sourceLanguage | Java String | ru |
| targetLocale | Java String | US |
| targetLanguage | Java String | en |

In the example shown, the text entered by the user is inserted into both baseString 304 and sortString 306, but the text entered into altString 308 is selected by transliteration engine 320 utilizing a resource table of Russian Cyrillic to English character sound mappings. The phonetic representation of the baseString 304 is thus entered into altString 308 as a pronunciation key for users unfamiliar with the Cyrillic character set.

For languages which do not employ the latin character set or a character set which may be sound-mapped to the latin character set, data entry methods 310 input data into the baseString 304, sortString 306, and altString 308 fields which is derived from the input method editor (IME) 324. IME 324 may be either a customized input method editor or the input method editor which is integrated into Asian versions of the Windows NT operating system available from Microsoft Corporation of Redmond Washington. If the Windows NT input method editor is employed, the appropriate data must be extracted from the Windows NT input method editor internal data storage.

Table IV illustrates how data is entered into IString class 302 by data entry methods 310 for logosyllabic languages, such as Japanese, which employ neither the latin character set nor a character set which may be sound-mapped to the latin character set.

TABLE IV

| Field | Type | Data |
| --- | --- | --- |
| baseString | Java String | <Kanji> |
| sortString | Java String | 한짓 |
| altString | Java String | hayashi |
| sourceLocale | Java String | JP |
| sourceLanguage | Java String | ja |
| targetLocale | Java String | US |
| targetLanguage | Java String | en |

Logosyllabic languages do not have alphabets, but instead have very large character sets with symbols ("ideographs") corresponding to concepts and objects rather than simple sounds. For instance, the Joyo Kanji List (Kanji for Daily Use) adopted for the Japanese language in 1981 includes 1945 symbols. Normal computer keyboards cannot contain enough separate keys to have one for each symbol in the language, so input is accomplished phonetically utilizing keystroke combinations to select characters from one of two phonetic syllabaries, hiragana or katakana, and dictionary lookup for Kanji symbol creation. The process is implemented in the Windows NT input method editor identified above.

For logosyllabic or ideograhic languages, therefore, the data entered into altString 308 is the latin characters typed by the user to compose the desired ideograph. The data entered into sortString 306 are the syllabary characters phonetically spelling the desired ideograph, providing an intermediate representation of the ideograph. The data entered into baseString 304 is the final ideograph selected by the user. As with transliteration of non-latin characters as described above, non-latin characters may be entered into altString 308 if the targetLanguage property is set to a language other than English and IME 324 supports composition of the ideographs by phonetic spelling in a language other than English. For instance, an IString object 302 might contain Japanese Kanji in baseString 304, hiragana in sortString 306, and Cyrillic characters in altString 308 if IME 324 permits composition of Japanese Kanji characters by phonetic spelling in Russian.

A suitable constructor for receiving baseString 304, sortString 306 and altString 308 from IME 324 via data entry methods 310 for entry into an IString object 302 may be:

```
/******************************************
 *
 * <P> </P>
 *
 * <dt> <b>Description:</b> <dd>
 *
 * <p> Allocate a new IString. The baseString, sortString and
 * altString are entered from the IME utilizing the default language and
 * locale. </p>
 *
 ******************************************
public IString(String base,
        String sort,
        String alt,
        Locale src
        Locale tgt) {
    this.baseString = base;
    this.sortString = sort;
    this.altString = alt;
    this.sourceLocale = src.getLocale();
    this.sourceLanguage = src.getLanguage();
    this.targetLocale = tgt.getLocale();
    this.targetLanguage = tgt.getLanguage();
    }
```

The contents of baseString 304, sortString 306 and altString 308 are entered into the respective fields from data derived from IME 324, while the contents of sourceLocale 312 and sourceLanguage 314 are entered from the default locale and language properties specified by the host system in which data is being entered into IString object 302. The contents of targetLocale 316 and targetLanguage 318 will typically be a locale/language code for a language utilizing the latin character set such as "en_US" (English_United States).

Regardless of the language in which text is entered into an IString class object 302, the data automatically entered into each of the baseString 304, altString 306, and sortString 308 by data entry methods 310 may be overridden or altered using other methods. The fields of an IString object 302 may preferably be individually and independently edited, allowing artificial promotion within sortString field 306 as described above, replacement of an erroneously selected ideograph in baseString field 304, or correction of a phonetic spelling within altString field 308.

While the above-described methods assumed that the source and target languages were taken from host system defaults, data may alternatively be entered into baseString 304, sortString 306 and altString 308 for specified source and target languages utilizing the constructor:

```
/***************************************************
 *
 * <P> </P>
 *
 * <dt> <b>Description:</b> <dd>
 * <p> Allocate a new IString. The baseString, sortString and
 * altString are entered from the IME for specified target and source
 * language and locale. </p>
 *
 ***************************************************/
public IString(String base,
            String sort,
            String alt,
            String srcLanguage,
            String srcLocale,
            String tgtLanguage,
            String tgtLocale) {
    this.baseString = base;
    this.sortString = sort;
    this.altString = alt;
    this.sourceLocale = src.Locale;
    this.sourceLanguage = srcLanguage;
    this.targetLocale = tgt.Locale;
    this.targetLanguage = tgt.Language;
}
```

In this constructor, the source and target language and locale which are employed to select the characters entered into baseString 304, sortString 306 and altString 308 may be specified. This latter constructor may be employed to create an IString object 302 in other than the host system default language, or in host systems where data for the IString object 302 is received from another system and a local instance is created.

It should be noted that transliteration engine 320 and messaging methods 326 need not necessarily be implemented within an IString class 202 as depicted in FIG. 2, and that IME method 320 need not be implemented separately. Transliteration engine 320 and messaging methods 326 may instead be implemented within separate subclasses which are appropriately constructed and/or invoked by IString class 302 as necessary, while IME 324 may be implemented as a method within IString class 302.

Transliteration engine 320 and IME 324 and are only required by data entry methods 310 to gather input data for IString class 302 objects under certain locale and language property settings. Otherwise, data may be programmatically input into baseString 304, sortString 306,.and altString 308 by invoking the proper constructor. The methods which may be invoked by programs at runtime to programmatically get and set fields within IString 302 include:

```
/***************************************************
 *
 * <P> </P>
 *
 * <dt> <b>Description:</b> <dd>
 * <p> Get the IString baseString. </p>
 *
 * @returns str String containing the base string
 *
 ***************************************************/
public String getBaseString() {
    return this.baseString;
}
```

This method returns the contents for baseString 304 for an IString object 302. Similar methods return the contents of sortString 306 and altString 308:

```
/***************************************************
 *
 * <P> </P>
 *
 * <dt> <b>Description:</b> <dd>
 * <p> Get the IString sortString. </p>
 *
 * @returns str String containing the sort string
 *
 ***************************************************/
public String getSortString() {
    return this.sortString;
}
/***************************************************
 *
 * <P> </P>
 *
 * <dt> <b>Description:</b> <dd>
 * <p> Get the IString altString. </p>
 *
 * @returns str String containing the alt string
 *
 ***************************************************/
public String getAltString() {
    return this.altString;
}
```

The methods also include setting baseString 304:

```
/***************************************************
 *
 * <P> </P>
 *
 * <dt> <b>Description:</b> <dd>
 * <p> Set the IString baseString. </p>
 *
 * @param str String containing the base string
 *
 ***************************************************/
public void setBaseString(String sBase) {
    this.baseString = sBase;
}
``` as well as sortString 306 and altString 308:

```
/***************************************************
 *
 * <P> </P>
 *
 * <dt> <b>Description:</b> <dd>
 * <p> Set the IString sortString. </p>
 *
 * @param str String containing the sort string
 *
 ***************************************************/
public void setSortString(String sSrt) {
    this.sortString = sSrt;
}
```

```
/****************************************************
*
* <P> </P>
*
* <dt> <b>Description:</b> <dd>
* <p> Set the IString altString. </p>
*
* @param str String containing the alt string
*
****************************************************/
public void setAltString(String sAlt) {
        this.altString = sAlt;
        }
```

In addition to getting and setting baseString 304, sortString 306, and altString 308 for an IString object 302, programs may need to get or set the display locale or language of an IString object 302. Accordingly, other methods are provided to permit a program to get and/or set the locale or language properties of IString data:

```
/****************************************************
*
* <P> </P>
*
* <dt> <b>Description:</b> <dd>
* <p> Get the locale of the IString data. </p>
*
* @returns loc Locale containing the locale of the data
*
****************************************************/
public Locale getLocale() {
    Locale loc = new Locale(this.sourceLanguage, this.sourceLocale);
    return loc;
    }
/****************************************************
*
* <P> </P>
*
* <dt> <b>Description:</b> <dd>
* <p> Set the locale of the IString data. </p>
*
* @param loc Locale of the data
*
****************************************************/
public void setLocale(Locale loc) {
    this.sourceLocale = loc.getLocale();
    this.sourceLanguage = loc.get:Language();
    }
/****************************************************
*
* <P> </P>
*
* <dt> <b>Description:</b> <dd>
* <p> Get the display language of the IString data. </p>
*
* @returns Display language of the data
*
****************************************************/
public String getDisplayLanguage () {
    Locale loc = new Locale(this.sourceLanguage, this.sourceLocale);
    return loc.getDisplayLanguage();
    }
/****************************************************
*
* <P> </P>
*
* <dt> <b>Description:</b> <dd>
* <p> Get the display locale of the IString data. </p>
*
* @returns Display locale of the data
*
```

```
****************************************************/
public String getDisplayLocale() {
    if(this.sourceLanguage = = null&&this.sourceLocale = = null)
        return null;
    else {
        Locale loc = new Locale(this.sourceLanguage, this.sourceLocale):
        return loc.getDisplayLocale();
        }
    }
```

While these methods are available, IString class 302 preferably exhibits a "black box" behavior such that the programmer/user need not know anything about the methods implemented for IString class 302. IString class 302 simply appears as a data type which encapsulates extra information about baseString 304 and also includes some methods for transforming characters from one character set to another. For special cases where the sortString field 306 or altString field 308 are to be exposed to the user in addition to or in lieu of baseString 304, either for editing or for display only, a separate set of controls may be provided.

In the present invention, IString class 302 is employed to effectively transfer human language data across systems employing incongruous languages. The contents of baseString 304 provide a native representation of the text in the default language of the system originating the IString object 302. However, for each system participating in the exchange of data with other systems running in different human languages, the targetLocale property 316 and targetLanguage 318 property of an IString object 302 are preferably set to a common value (e.g., targetLocale="US", targetLanguage="en"). The contents of altString 308 will thus contain a common, cross-language representation of the text string. In systems where the default language of a system receiving an object differs from the language of the contents of baseString 304, IString class object 302 may automatically switch to presenting the contents of altString 308 as the text string to be displayed or processed.

Figure 4:
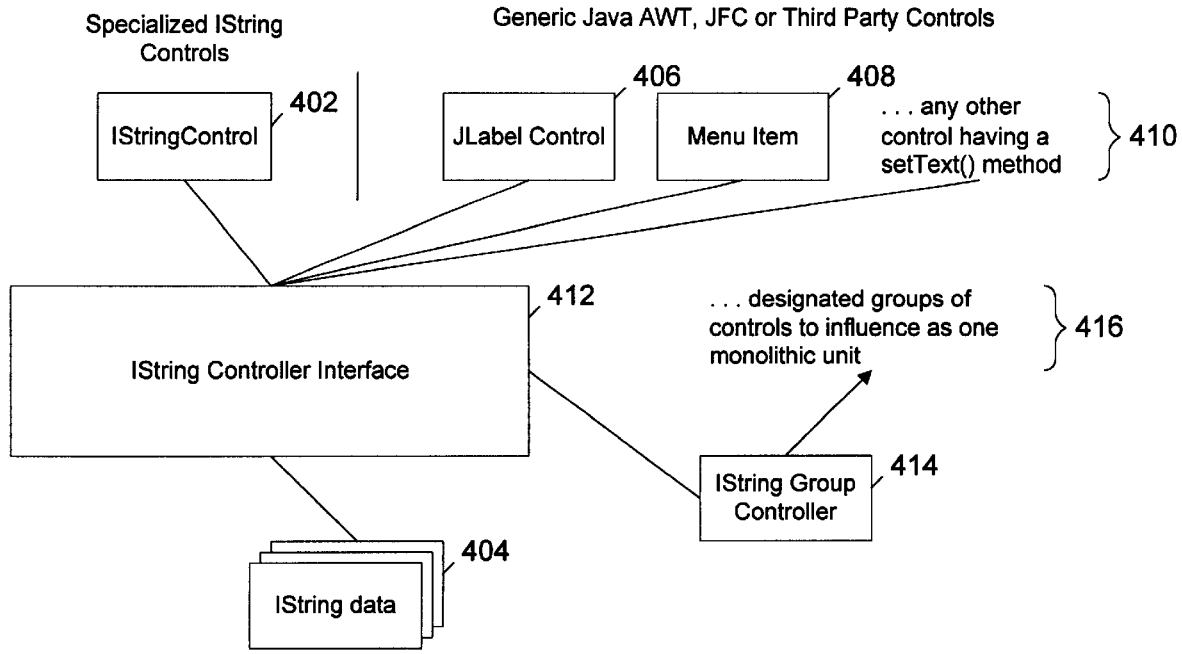
FIG. 4 is a diagram of a mechanism for providing control over the display and editing of individual multi-field text class objects or discrete sets of multi-field text class objects in accordance with a preferred embodiment of the present invention.

Referring to FIG. 4, a diagram of a mechanism for providing control over the display and editing of individual multi-field text class objects or discrete sets of multi-field text class objects in accordance with a preferred embodiment of the present invention is depicted. The mechanism depicted may be employed to implement a rotate control for IString objects.

In order to enable all Java Abstract Windowing Toolkit (AWT) controls to use and display IString information, a text manager class, IStringControl 402, and an IString controller interface 412 are defined. IString controller interface 412 intercepts all display requests to IString objects 404, passing the contents of a current display field to a control in response to such display requests. IString controller interface 412 thus allows legacy controls to display the contents of IString objects 404 without a specialized display control.

The constructor for IStringControl 402 takes as its parameters an IString class 404 and a Java Foundation Class (JFC) control 406, a menu item 408, or any other control 410 having a setText( ) method. IStringControl 402 is responsible for managing which IString field (baseString, sortString, or altString) is visible in the control which it manages, and for implementing methods to enter or change text within the IString objects 404. IStringControl 402 intervenes in all calls to the setText( ) method of any control, performing the necessary processing to enter text in a field of an IString object 404 utilizing a control.

For each instance of a text control within a user interface dialog, instead of calling the setText( ) method on the JFC control, an IString controller interface 412 and the JFC control are created along with an IStringControl 402 to manage the JFC control. This allows a dialog or frame containing a number of single-valued, text-based controls (e.g., JLabel or JTextField) to show IString values. Additionally, instead of taking a JFC control as one of its constructor parameters, IStringControl 402 could take a java.awt.Component instead and look for a setText( ) method employing introspection, making IString support potentially ubiquitous.

The IString controller ("IStringControlActions") interface 412 is also defined with methods for configuring and querying IStringControl 402. Such methods include:
  public void setText(IString text),
  public IString getText( ),
  public void setVisibleField(int field),
  public int getVisibleField( ),
  setPopupEnabled(boolean enabled), and
  isPopupEnabled( ).

The getText( ) and getVisibleField( ) methods are not voided within controller interface 412 to allow controller interface 412 to pass the contents of the current display field ("visibleField") to a legacy control, including Java AWT controls such as JLabel Control 406, JFC controls such as Menu Item 408, or any other control 410 including a getText( ) method.

The setText( ) and setVisibleField( ) methods within controller interface 412 are voided since a specialized IString control 402 should intervene in any calls to a setText( ) method within a legacy control. The parameter "field" in the methods listed above is either IStringControl.BASE, IStringControl.SORT, or IStringControl.ALT. The last two methods listed above determine whether popup displays are shown with IString field contents.

Additionally, a grouping class 414, analogous to ButtonGroup and called IStringControlGroup in the example, may be defined which implements the IStringControlOptions method. Instances 416 of IStringControl 402 may be added to grouping class 414 to create a context, such as a dialog or an entire application, within which all controls are configurable at once. With the structure shown in FIG. 4 and described above, the application and even the programmer have very little extra work to perform in order to utilize IString data within an application, although a richer set of methods for special operations may be utilized if desired.

Controller interface 412 also provides a mechanism for changing the display of IString data via messaging. IString data objects 404, controls 402, 406, 408, and 410, and group controller 414 all may register as listeners with controller interface 412 for messages which contain the language and/or locale code, such as a language change message, a locale change message, or a display change message. Language and locale change messages may alter the language and locale property settings within the underlying system, while a display change message may simply alter the language and/or locale (separately or jointly) employed to select IString data display fields without altering the underlying system language and locale properties.

Referring to FIGS. 2B–2F, examples of a rotate user interface control for changing a current display field progressively through a nonrepeating sequence of fields within a multi-field text string object in accordance with a preferred embodiment of the present invention are depicted. Control 202 is preferably a specialized IString control 402 capable of requesting the contents of any field within an IString object.

Control 202 includes a display area 204 for displaying the contents of the current display field of an IString object 302 or 404, as well as a rotate control 208 for changing the current display field for the IString object to a different field. The contents of the currently selected display field of the IString object 302 or 404 may be retrieved by the getVisibleField method for display. A visibleField parameter within IString object 302 or 404 identifies which field, baseString 304, sortString 306, or altString 308, is currently selected for display. Based on the visibleField parameter, the getVisibleField method effectively performs a getText (field) process on the IString object 302 or 404, where the "field" parameter is IString.BASE, IString.SORT, or IString.ALT, to retrieve the string within the field currently selected for display.

Rotate control 208 is an area containing indicators as described above which is actuated by "clicking" on rotate control 208, manipulating a pointing device until the cursor is over selection control 208, and then actuating the pointing device or a particular button on the pointing device. When actuated, selection control 208 changes the current display field from a current field to a next field within an ordered sequence of all three fields of the IString object 302 or 404, in the order baseString 304, sortString 306, altString 308, then back to baseString 304.

FIGS. 2C through 2E illustrate the operation of rotate control 208. In FIG. 2C, the contents of baseString 304 are displayed in the display area, which in the example shown are the Kanji symbols for the Japanese holiday "tango no sekku." In FIG. 2D, the rotate control has been actuated and the contents of sortString 306 are displayed, which are hiragana characters phonetically spelling the Japanese holiday name "tango no sekku." In FIG. 2E, the rotate control has again been actuated and the contents of altString 308 are displayed, which are latin characters phonetically spelling the Japanese holiday name "tango no sekku." Subsequent actuation of the rotate control would return the display to the contents of baseString 304, as shown in FIG. 2C.

The contents of the display area for a rotate control may be either editable or noneditable. FIG. 2A depicts one visual representation of a noneditable display area, in which the background behind the displayed characters is the same color and pattern as other portions of the control (conventionally plain gray), providing the user with a visual cue. FIGS. 2C–2E show a visual representation of an editable display area, in which a different background (conventionally white) behind the text provides a similar visual cue. A user may edit the contents of a currently selected display field without altering the contents of the remaining fields by double-clicking on the display area while the field to be edited is displayed. The user-specified text string, which may include any Unicode characters, is stored in the currently displayed field with a setText( ) method. To edit the contents of a field which is not currently displayed, the user employs the rotate control to change the current display field until the field to be edited is displayed, then edits the field within display area.

Rotate user control 202 may be suitably implemented within status bars or, as shown in FIG. 2F, may be integrated into a dialog box 212 with other controls. As shown, the other controls may include, for example, radio buttons 214 controlling whether rotate control 208 is enabled or disabled and whether the contents of display area 204 are read-only or editable. In this manner, utilizing the corresponding parameters of rotate control 208 and display area 204 alone or in combination, control 202 may prevent the user from altering the current display field for a specific IString object, from editing the contents of any field with a specific IString object, or from editing the contents of a specific field within a specific IString object.

Figure 5:
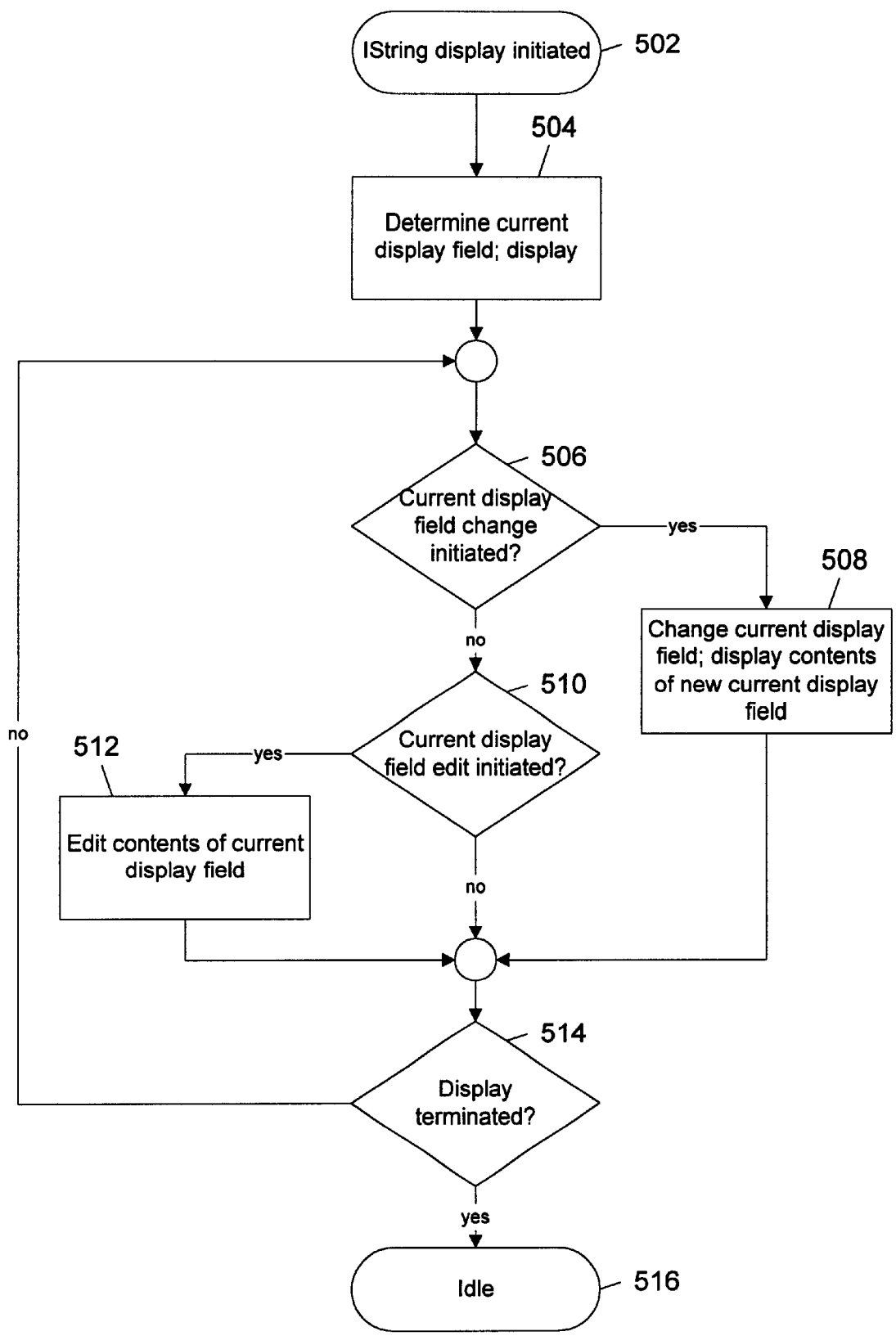
FIG. 5 depicts a high level flowchart for the operation of a rotate user control for selectively changing a current display field progressively through a nonrepeating sequence of the fields within a multi-field text string in accordance with a preferred embodiment of the present invention.

With reference now to FIG. 5, a high level flowchart for the operation of a rotate control for selectively changing the current display field to a next field within a multi-field text string in accordance with a preferred embodiment of the present invention is depicted. The process illustrated is a process by which rotate user control 202 depicted in FIGS. 2A–2F operates. The process begins at step 502, which depicts display of an IString object with rotate user control 202 being initiated, then passes to step 504, which illustrates determining which field of the IString object is the current display field and displaying the contents of that field within the control.

The process next passes to step 506, which depicts a determination of whether a change in the display field has been initiated, as by a user actuating rotate control 208. If so, the process proceeds to step 508, which illustrates changing the current display field to the next field within the sequence and altering the contents of display window 204 to display the newly selected current display field.

If no change in the current display field is initiated, the process proceeds instead to step 510, which depicts a determination of whether an edit of the contents of the current display field has been initiated, as by the user double-clicking on display window 204. If so, the process proceeds to step 512, which illustrates editing the contents of the current display field using a simple editor, the transliteration engine, or the IME depending on the source and target languages of the IString and on the field being edited.

From either of steps 508 or 512, the process next passes to step 514, which depicts a determination of whether the display of an IString object with control 202 has been terminated. If not, the process returns to step 506 to await further user initiation of a display field change or edit. If so, however, the process proceeds instead to step 516, which illustrates the process becoming idle until another display of an IString object utilizing control 202 is initiated.

The user control of the present invention allows a user to derive benefits of the IString class by switching views between different fields of an IString object to see different representations of the text string. A user unable to recognize, understand or pronounce a text string based on a representation stored within the current display field may switch to another representation, such as a phonetic spelling of the text string. Switching views with the rotate control of the present invention is faster than with other controls for changing a display item, and provides a fixed view of the currently selecting display field.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of changing display, comprising:

displaying a current display item from a group of display items within a display area, wherein each display item within the group of display items is a different character string representation of a single text string;

providing a display control changing the current display item from one item within the group to a next item within the group; and responsive to each user actuation of the display control, changing the current display item to the next within the group of the display items in an ordered sequence of display items forming an internal loop.

2. The method of claim 1, wherein the step of displaying a current display item from a group of display items within a display area further comprises:

displaying an indicator of which display item within the group of display items is the current display item.

3. The method of claim 1, wherein the step of displaying a current display item from a group of display items within a display area further comprises:

displaying an ideograph representing the text string within the display area.

4. The method of claim 1, wherein the step of providing a display control changing the current display item from one item within the group to a next item within the group further comprises:

providing a display control changing the current display item from one item to a next item within an ordered sequence of display items in the group, wherein the ordered sequence forms an internal loop including all display items in the group.

5. The method of claim 1, wherein the step of changing the current display item to the next item within the group of the display items further comprises:

upon actuation of the display control a number of times equal to the number of display items within the group, rotating the current display item through each item within the group.

6. The method of claim 1, wherein the step of changing the current display item to the next item within the group of the display items further comprises:

upon each actuation of the display control, changing an indicator to identify the next item as the current display item.

7. The method of claim 1, further comprising:

upon each change of the current display item to the next display item, displaying the next display item within the display area.

8. A system for changing a display, comprising:

means for displaying a current display item from a group of display items within a display area, wherein each display item within the group of display items is a different character string representation of a single text string;

means for providing a display control changing the current display item from one item within the group to a next item within the group; and means, responsive to each user actuation of the display control, for changing the current display item to the next item within the group of the display items in an ordered sequence of display items forming an internal loop.

9. The system of claim 8, wherein the step of displaying a current display item from a group of display items within a display area further comprises:

means for displaying an indicator of which display item within the group is the current display item.

10. The system of claim 8, wherein the means for displaying a current display item from a group of display items within a display further comprises:

means for displaying an ideograph representing the next string within the display area.

11. The system of claim 8, wherein the means for changing the current display item to the next within the group of the display items further comprises:

means for changing the current display item to the next within an ordered sequence of display items forming an internal loop.

12. The system of claim 8, wherein the means for changing the current display item to the next item within the group of the display items further comprises:

means, conditioned upon actuation of the display control a number of times equal to the number of display items within the group, for rotating the current display item through each item within the group.

13. The system of claim 8, wherein the means for changing the current display item to the next item within the group of the display items further comprises:

means, conditioned upon each actuation of the display control, for changing an indicator to identify the next item as the current display item.

14. The system of claim 8, further comprising:

means, conditioned upon each change of the current display item to the next display item, for displaying the next display item within the display area.

15. A computer program product within a computer usable medium for changing a display, comprising:

instruction for displaying a current display item from a group of display items within a display area, wherein each display item within the group of display items is a different character string representation of a single text string;

instructions for providing a display control changing the current display item from one item within the group to a next item within the group; and instructions, responsive to each other user actuation of the display control, for changing the current display item to the next item within the group of the display items in an ordered sequence of display items forming an internal loop.

16. The computer program product of claim 15, wherein the step of displaying a current display item from a group of display items within a display area further comprises:

instructions for displaying an indicator of which display item within the group is the current display item.

17. The computer program product of claim 15, wherein the instructions for displaying a current display item from a group of display items within a display area further comprises:

instructions for displaying an ideograph representing the text string within the display area.

18. The computer program product of claim 15, wherein the instructions for changing the current display item to the next item within the group of the display items further comprises:

instructions for changing the current display item to the next item within an ordered sequence of display items forming an internal loop.

19. The computer program product of claim 15, wherein the instructions for changing the current display item to the next item within the group of the display items further comprises:

instructions, conditioned upon actuation of the display control a number of times equal to the number of display items within the group, for rotating the current display item through each item within the group.

20. The computer program product of claim 15, wherein the instructions for changing the current display item to the next item within the group of the display items further comprises:

instructions, conditioned upon each actuation of the display control, for changing an indicator to identify the next item as the current display item.

21. The computer program product of claim 15, further comprising:

instructions, conditioned upon each change of the current display item to the next display item, for displaying the next display item within the display area.

* * * * *